US011416869B2

(12) United States Patent
Parker

(10) Patent No.: US 11,416,869 B2
(45) Date of Patent: Aug. 16, 2022

(54) DEVICES, SYSTEMS AND PROCESSES FOR SUBSTANTIALLY SIMULTANEOUS PAYMENT VERIFICATION USING MULTI-FACTOR AUTHENTICATION

(71) Applicant: DISH Wireless L.L.C., Englewood, CO (US)

(72) Inventor: Scott Parker, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 160 days.

(21) Appl. No.: 16/781,561

(22) Filed: Feb. 4, 2020

(65) Prior Publication Data

US 2021/0241286 A1 Aug. 5, 2021

(51) Int. Cl.

*G06Q 20/42* (2012.01)
*H04L 9/40* (2022.01)

(Continued)

(52) U.S. Cl.

CPC .......... *G06Q 20/42* (2013.01); *G06Q 20/202* (2013.01); *G06Q 20/209* (2013.01);

(Continued)

(58) Field of Classification Search

CPC ... H04L 63/08; H04L 2463/082; H04L 29/06; G06Q 20/3224; G06Q 40/02;

(Continued)

(56) References Cited

U.S. PATENT DOCUMENTS 6,246,103 B1 * 6/2001 Yu .................... H01L 29/7311 257/557
7,499,889 B2 * 3/2009 Golan .................. G06Q 20/04 705/40

(Continued)

OTHER PUBLICATIONS

Papadimitriou, "How Credit Card Transaction Processing Works: Steps, Fees & Participants", "https://wallethub.com/edu/cc/credit-card-transaction/25511/", Apr. 2, 2009, Downloaded from the Internet on Jan. 12, 2020, Publisher: Wallethub.

*Primary Examiner* — Andrew Joseph Rudy
(74) *Attorney, Agent, or Firm* — Wash Park IP Ltd.; John T. Kennedy

(57) ABSTRACT

Embodiments of devices, systems and processes for substantially simultaneous payment verification using multi-factor authentication are described. A system may include a user payment system (UPS), a point of sale system (POS) communicatively coupled to the user payment system, and an issuing bank system (IBK) communicatively coupled to at least the POS. The IBK system may include an IBK hardware processor configured to execute first non-transient computer executable instructions including instructions for establishing a direct connection between the IBK and the UPS. The instructions may also include those for communicating, using the direct connection, a query to the UPS, receiving a first response, from the UPS, to the query, and based, upon the first response, determining whether to approve a given transaction. The direct connection may use a 5G wireless link. The query may be communicated to substantially simultaneously with receipt of a request to approve the given transaction.

21 Claims, 5 Drawing Sheets

(51) Int. Cl.

| | |
|---|---|
| ***H04W 12/06*** | (2021.01) |
| ***G06Q 20/20*** | (2012.01) |
| ***G06Q 40/02*** | (2012.01) |
| ***G06Q 20/32*** | (2012.01) |
| ***H04W 76/14*** | (2018.01) |
| ***H04W 4/029*** | (2018.01) |
| ***G06Q 20/38*** | (2012.01) |
| *H04W 84/04* | (2009.01) |

(52) U.S. Cl.

CPC ..... *G06Q 20/3223* (2013.01); *G06Q 20/3224* (2013.01); *G06Q 20/382* (2013.01); *G06Q 40/02* (2013.01); *H04L 63/08* (2013.01); *H04W 4/029* (2018.02); *H04W 12/06* (2013.01); *H04W 76/14* (2018.02); *H04L 2463/082* (2013.01); *H04W 84/042* (2013.01)

(58) Field of Classification Search

CPC .. G06Q 20/4097; G06Q 20/202; G06Q 20/42; G06Q 20/401; G06Q 20/3223; G06Q 20/209; G06Q 20/382; G06Q 20/20; G06Q 20/38; G06Q 20/32; H04W 76/14; H04W 84/042; H04W 12/06; H04W 4/029

USPC ........................................................... 705/21

See application file for complete search history.

(56) References Cited

U.S. PATENT DOCUMENTS

| | | | | |
|---|---|---|---|---|
| 8,615,438 | B2 * | 12/2013 | Hammad | G06Q 20/325 705/21 |
| 8,768,854 | B2 * | 7/2014 | Neville | G06Q 20/38 705/75 |
| 9,218,594 | B2 * | 12/2015 | Ramakrishna | G06Q 20/3255 |
| 11,113,690 | B2 * | 9/2021 | Woods | G06Q 20/3821 |
| 2014/0136353 | A1 * | 5/2014 | Goldman | G06Q 20/405 705/21 |
| 2014/0344158 | A1 * | 11/2014 | Hirka | G06Q 20/40 705/44 |
| 2018/0300705 | A1 * | 10/2018 | Link | G06Q 20/405 |
| 2020/0058013 | A1 * | 2/2020 | Carter | G06Q 20/3224 |

* cited by examiner

DEVICES, SYSTEMS AND PROCESSES FOR SUBSTANTIALLY SIMULTANEOUS PAYMENT VERIFICATION USING MULTI-FACTOR AUTHENTICATION

TECHNICAL FIELD

The technology described herein generally relates to devices, systems, and processes for payment processing systems. More specifically, the technology described relates to devices, systems and processes for providing simultaneous payment verification. More specifically, the technology described relates to devices, systems and processes for payment verification using multi-factor authentication.

BACKGROUND

Various devices, systems and processes today enable a person to engage in commercial transactions using a payment device or system. The payment device/system may be provided physically, such as via a credit card or debit card (collectively, a "credit card") or virtually via a mobile device, such as a smartphone, a smart watch, via an online payment mechanism, or the like. Often such payment devices rely upon a single authentication between a payment device and a point of sale terminal for a given transaction to be approved. The single authentication, for example, in the case of a physical payment device may involve the use of a smart credit card, such as one embedded with a security "chip" that communicates encrypted information to a point of sale terminal, or other payment acceptance device, with such encrypted information being forwarded to a merchant or transaction processing system for verification and authentication. Similarly, a single authentication may involve the entry of a pin, a passcode or the like at the point of sale terminal or onto an online e-commerce site. The providing of a PIN may occur when a smart chip is or is not available, and often is required for use of a virtual payment device. Such pin, passcode, or the like may arise upon initial use of a virtual payment device, during a given transaction, or otherwise.

In "How Credit Cards Transaction Processing Works: Steps, Fees and Participants" by Odysseas Papadimitriou, of Apr. 2, 2009 as available from the Internet at https://wallethub.com/edu/cc/credit-card-transaction/25511/, the entire contents of which are incorporated herein by reference (herein, "Papadimitriou"), Papadimitriou describes how current credit card transactions are processed. As described, authentication is based on various fraud protection tools, such as Address Verification Service, which typically uses one's zip code number, and any other numeric portion of a card holder's address. Other fraud protection tools include a card verification value (CVV) number and the like. It is to be appreciated that each of these tools rely upon information readily obtainable by a person seeking to perpetuate fraud, such as by memorizing or recording the same, as use for an earlier transaction.

Further, some systems today provide for post transaction payment notification. For example, an alert message, via text or otherwise, may be communicated, by a transaction processing system or otherwise, to a registered holder of the payment device. Such an alert message may inform such registered holder that a transaction was completed for a specified amount, with an identified merchant on a given date, at a given location, and at a given time. If the transaction was not authorized, the user may then timely respond by notifying the issuing bank of the same. Yet, the providing of such an alert message and user response, if any, occurs after a transaction has been completed and often may be delayed when communications systems are not readily available, the user is pre-occupied, networks are congested, and otherwise.

It is to be appreciated that today's use of essentially single factor authentication and post transaction alert messaging is often ripe for fraud, abuse, and the like. Accordingly, the various embodiments of the present disclosure address these and other needs by providing technologically based devices, systems and processes for substantially simultaneous payment verification using multi-factor authentication.

SUMMARY

The various embodiments of the present disclosure describe devices, systems, and processes for providing substantially simultaneous payment verification using multi-factor authentication.

In accordance with at least one embodiment of the present disclosure, a system may include a user payment system (UPS), a point of sale system (POS) communicatively coupled to the user payment system, and an issuing bank system (IBK) communicatively coupled to at least the POS. The IBK system may include an IBK hardware processor configured to execute first non-transient computer executable instructions including instructions for establishing a direct connection between the IBK and the UPS. The instructions may also include those for communicating, using the direct connection, a query to the UPS, receiving a first response, from the UPS, to the query, and based, upon the first response, determining whether to approve a given transaction.

For at least one embodiment, the direct connection may include use of a fifth generation (5G) wireless communications link. For at least one embodiment, the query may be communicated to the UPS substantially simultaneously with receipt, by the IBK, of a request to approve the given transaction.

For at least one embodiment, the first non-transient computer executable instructions may further include instructions for communicating an approval for the given transaction to a clearing system (CS) for a credit card transaction processing system. For at least one embodiment, the approval may be communicated substantially simultaneously with an inputting, by a user of the UPS, of an approval for the given transaction.

For at least one embodiment, the approval may be communicated with an approval of the given transaction based upon at least one of an initial authentication, a user device authentication, a passcode authentication, a UPS location authentication, a POS location authentication and a location match authentication.

For at least one embodiment, the approval may be communicated to the CS based on a multi-factor authentication of the given transaction. The multi-factor authentication includes three or more of an initial authentication, a user device authentication, a passcode authentication, a UPS location authentication, a POS location authentication and a location match authentication.

For at least one embodiment, the first non-transient computer executable instructions may further include instructions for communicating an approval for the given transaction to the UPS. For at least one embodiment, the UPS may be a smartphone associated with a given user.

For at least one embodiment, the UPS may include an UPS hardware processor configured to execute second non-transient computer executable instructions including instructions for initializing the UPS for transactional use. The instructions may include instructions for one or more of facilitating establishment of the direct connection with the IBK, receiving the query from the IBK, presenting the query in a humanly perceptible format, detecting a user response to the query, converting the user response into the first response, and communicating the first response to the IBK.

For at least one embodiment, the initializing of the UPS may occur prior to communication of the given transaction to the IBK. For at least one embodiment, the second non-transient computer executable instructions may include instructions for one or more of determining a user device location (UDL) of the UPS, and communicating the UDL to the IBK.

For at least one embodiment, the first non-transient computer executable instructions may include instructions for one or more of receiving the UDL from the UPS, verifying the UDL, and when the UDL is verified, communicating a UDL acceptance message to at least one of the UPS, the POS, an acquiring bank system (ABK) and a clearing system (CS).

In accordance with at least one embodiment of the present disclosure, a process may include performing an issuing bank system (IBK) approval authentication process. The process may further include determining whether to approve a given transaction for a user payment system (UPS) based on results from the IBK approval authentication process.

For at least one embodiment, the IBK approval authentication process may further include establishing a direct, 5G communications link between the IBK and the UPS. For at least one embodiment, the 5G communications link may be used for one or more of sending, by the IBK, a query regarding the given transaction to the UPS and receiving, by the IBK, a response to the query from the UPS. For at least one embodiment, the query and response may occur substantially simultaneously with a providing an approval request for the given transaction. For at least one embodiment, the approval request may be received by the IBK during an initial authentication process for a credit card transaction.

For at least one embodiment, the process may include performing a first authentication. The first authentication may include at least one of a user device authentication process, a passcode authentication process, a UPS location authentication process, a POS location authentication process, and a location match authentication process.

For at least one embodiment, a user device authentication process may include one or more of unlocking a user payment system (UPS) and setting an AUTH-1 flag on the UPS.

For at least one embodiment, a passcode authentication process may include one or more of unlocking a credit account to access account information, communicating the account information to the IBK, and verifying, by the IBK, the account information. For at least one embodiment, the credit account may be provided by a payment application executing on the UPS. For at least one embodiment and when the account information is verified, the process may include one or more of receiving, by the UPS, a passcode authentication message from the IBK and setting, by the UPS, an AUTH-2 flag. For at least one embodiment and upon each of the AUTH-1 flag and the AUTH-2 flag being set, the process may include communicating the given transaction to the IBK.

For at least one embodiment, a UPS location authentication process may include one or more of determining, by a location module for a user payment system (UPS), a user determined location (UDL), communicating the UDL to the IBK and verifying the UDL by the IDK. For at least one embodiment and when the UDL is verified, the process may include one or more of communicating, by the IBK to the UPS, a UDL acceptance message and setting, by the UPS, an AUTH-3 flag. For at least one embodiment and upon each of the AUTH-1 flag, the AUTH-2 flag, and the AUTH-3 flag being set, the process may include communicating the given transaction to the IBK.

In accordance with at least one embodiment of the present disclosure a device may include a hardware processor configured to execute non-transient computer executable first instructions for at least one of authorization engine for facilitating one or more of: a user device authentication process, a passcode authentication process, a UPS location authentication process, a location match authentication process, and an IBK approval authentication process. For at least one embodiment, the device may include a storage module, coupled to the hardware processor. For at least one embodiment, the device may include a GPS location module. For at least one embodiment, the device may include an input/output module.

For at least one embodiment, the device may include a hardware processor configured to facilitate each of a user device authentication, a passcode authentication process and an IBK approval authentication process. The authentications may occur based upon at least one input received from a user of the device via the input/output module.

For at least one embodiment, the device may include a hardware processor configured to facilitate a UPS location authentication process based upon position data received from the GPS location module.

For at least one embodiment, the device may include a hardware processor configured to facilitate substantially simultaneous payment verification of a credit card transaction by use of multi-factor authentication provided to the device based upon approvals arising from two or more of a user device authentication process, a passcode authentication process, a UPS location authentication process, a location match authentication process and an IBK approval authentication process.

For at least one embodiment, a device may include a communications module configured to facilitate establishment of a direct connection between the device and an issuing bank system. For at least one embodiment, the direct connection may be used during at least one of a passcode authentication process and an IBK approval authentication process. For at least one embodiment, the direct connection may be established over a fifth generation (5G) wireless communications link.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108_a_-108_n_, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments of the present disclosure describe devices, systems, and processes for providing substantially simultaneous payment verification using multi-factor authentication. As used herein, "substantially simultaneous" means that verification of payment aspects of a given commercial transaction (as distinguished from shopping, selection, scanning and other aspects of a commercial transaction) occur without any humanly perceptible and noticeable delay, wherein a humanly perceptible and noticeable delay is one where a transaction by a human being requires more than one (1) second from an initial providing of a payment device to a seller entity's payment device or system, such as a point of sale system (a "POS"), thru a completion of a multi-factor authentication process, and a reception of a payment receipt. It is to be appreciated that one or more of such processes may occur in whole or in part physically and/or virtually. For example, a payment device may be provided in a physical form, such as via a credit/debit card. A payment device may also be provided in a virtual form, such as by a tap of a smartphone to a POS, an entry of a credit/debit card into a webform or website, a use of an Amazon ONE-CLICK or similar automated payment process, or otherwise. Likewise, a transaction is deemed "completed" when a receipt is provided to the purchaser. Such receipt may be provided physically (for example, via a paper printout) and/or virtually (for example, via an email, text message, or otherwise).

Figure 1:
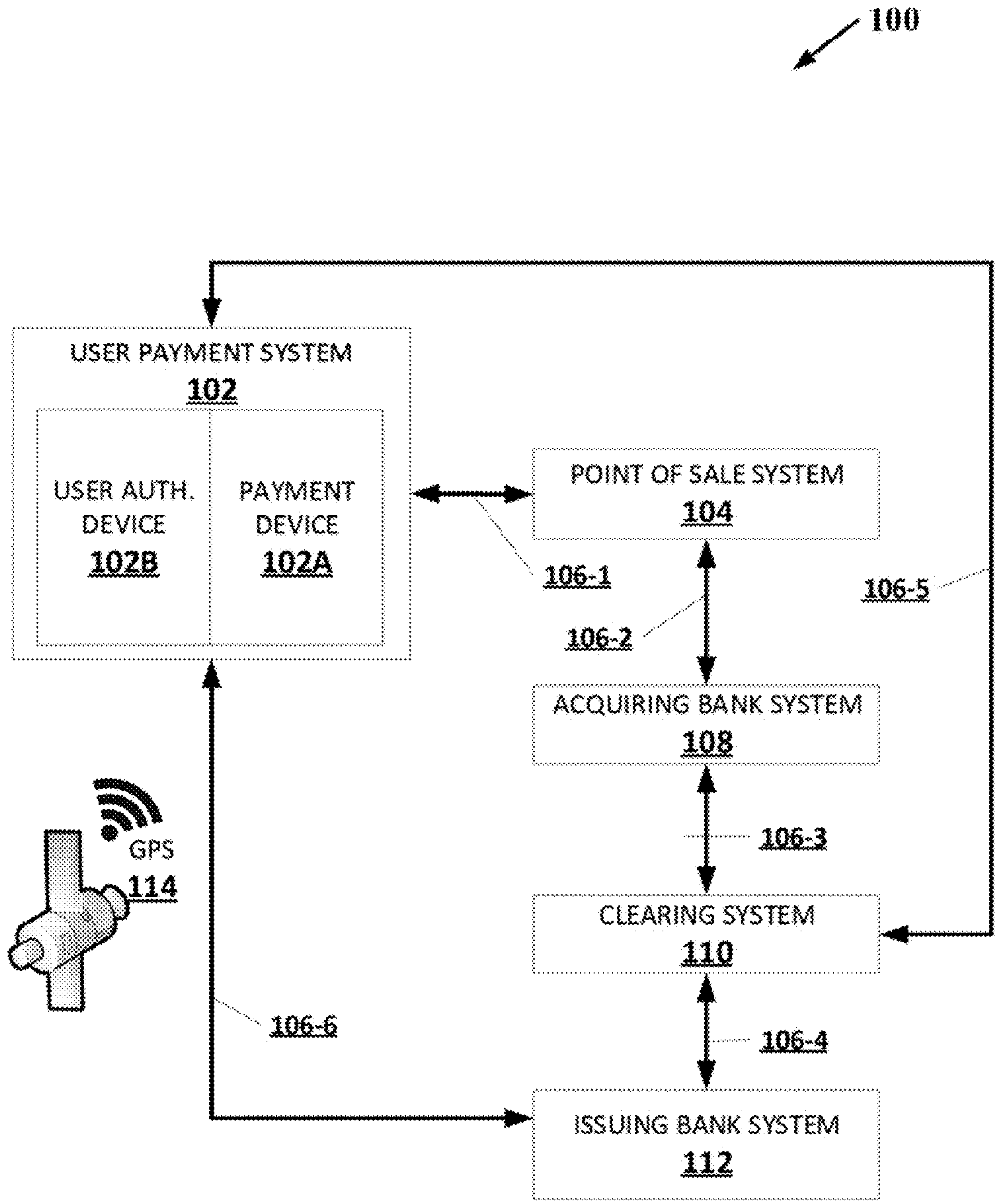
FIG. 1 is a schematic illustration of a system for facilitating substantially simultaneous payment verification using multi-factor authentication and in accordance with at least one embodiment of the present disclosure.

As shown in FIG. 1 and for at least one embodiment of the present disclosure, a system 100 for facilitating simultaneous payment verification using multi-factor authentication includes a user payment system 102 ("UPS") is communicatively coupled to a merchant's point of sale system ("POS") 104. As used herein, a "user" is an entity that seeks to acquire goods and/or services in exchange for "funds" from a "merchant." A "merchant" is any entity (or group or collective thereof) providing one or more goods and/or services to the user or any designated third party in exchange for a transfer of "funds." The "funds" may be any electronic financial instrument or other obligation (as distinguished from physical currency) to provide a certain consideration from the user (or other designated entity) to the merchant and under agreed upon terms and conditions. The funds may be transferred by use of various payment mechanisms including, but not limited to, a credit card number, an electronic transfer of funds, an authorization to debit a bank routing and account number, a debit from a PAYPAL account, a money transfer (as provided, e.g., by WESTERN UNION), or otherwise. The funds may be provided in any desired denomination, currency (including virtual currencies, such as Bitcoin), and otherwise. Accordingly and as used herein, a transaction involves a merchant receiving funds from a user in exchange for the providing of agreed upon goods and/or services to the user, or a designated third party, under agreed upon terms and conditions. Accordingly, the POS 104 may be a physical device, such as a terminal in a physical location, an online payment mechanism, such as a webform provided on a website, or otherwise that facilitates the electronic transfer of the funds.

The POS 104 is communicatively coupled to an acquiring bank system 108 ("ABK"). The ABK 108 is typically a banking entity by which the merchant processes electronic funds transactions. The ABK 108 is communicatively coupled to a clearing system 110 ("CS"). The CS 110 is communicatively coupled to an issuing bank system 112 ("IBK"). The IBK 112 is typically a banking entity that issued the payment mechanism (e.g., credit card) to the user. The CS 110 and the IBK 112 are also communicatively coupled to the UPS 102.

For at least one embodiment, the various system 100 components may be communicatively coupled using any known or later arising communications and/or networking technologies and using one or more connections, such as a first connection 106-1, a second connection 106-2, a third connection 106-3, a fourth connection 106-4, a fifth connection 106-5, and a sixth connection 106-6. For at least one embodiment, one or more of the first, second, third, fourth, fifth, and sixth connections 106-1/2/3/4/5/6 utilize, in whole or in part, similar network components. For at least one embodiment, one or more of the first, second, third, fourth, fifth, and sixth connections 106-1/2/3/4/5/6 utilize, in whole or in part, different network components. For at least one embodiment, the network components may include fifth generation ("5G") cellular networking components. For at least one embodiment, the network components utilized for one or more of the first thru sixth connections 106-1/2/3/4/5/6 may utilize any desired communications technologies and/or combinations thereof, in whole or in part, including, but not limited to, cellular technologies such as 3G/4G/5G, ethernet, wide area networks (WAN) such as the Internet, local area networks (LAN), asynchronous transfer mode (ATM) networks, Wi-Fi networks, and the like.

For at least one embodiment, the first connection 106-1 may be provided using a near-field communication (NFC) protocol and/or a personal area network (PAN) protocol such as Bluetooth, ZigBee, infrared data associate on (IrDA), and the like. For at least one embodiment, one or more of the second, third, fourth, fifth, and sixth connections 106-2/3/4/5/6 may be provided using one or more a LAN, a WAN, a 3G/4G/5G or other cellular network, the Internet, a Cloud network, or otherwise.

As used herein, a reference to "Cloud" includes without limitation references to cloud computing, cloud storage, cloud communications, and/or other technology resources which do not require a viewer to actively manage the providing or use of such resources. A use of a Cloud resource may be private (e.g., limited to certain users and/or uses), public (e.g., available for many users and/or uses), hybrid, dedicated, non-dedicated, or otherwise. It is to be appreciated that any device or system of the various embodiments of the present disclosure may use Cloud resources to provide for processing, storage and other functions.

For at least one embodiment, at least one of the fifth and sixth connections 106-5/6 utilize mid-band and/or high band 5G communications frequencies. As is commonly known and appreciated, mid-band 5G communications frequencies typically support communications of 100-400 Mb/s download and are typically deployed over 2.4 GHz to 4.2 GHz frequencies. Likewise, high band 5G communications frequencies typically support communications of 1-2 Gb/s download and are typically deployed over 24-72 GHz frequencies.

As further shown in FIG. 1, the system 100 may include one or more location systems, such as those provided by global positioning satellite (GPS) systems 114. Such location systems may be useful in determining a current location of a UPS 102, as discussed further below and in accordance with at least one embodiment of the present disclosure.

User Payment Device 102

For at least one embodiment, the UPS 102 may include a payment device 102A and a user authentication device 102B. They payment device 102A facilitates the transfer of funds to the merchant and is generally beyond the scope of the present disclosure. The payment device 102A may include a physical payment device such as a credit or debit card (herein, a "credit card" or "CC") and/or a virtual payment device (a "credit account" or "CA"). Each of the CC and CA may be configured to provide certain financial and other information (herein, "account info") associated with a given user to a POS. Non-limiting examples of account information include one or more of a user name, user billing address, CC number or CA number, an expiration date, a card security code (or CVC). It is to be appreciated that a payment amount, item purchased, service provided and/or other information for a given transaction is typically entered into a POS 104 by the merchant. Such additional "transaction information" may be entered into a POS 104 prior to or after a submission of account info by the user to the merchant. As is commonly appreciated, a user typically verifies such "transaction information" before approving a given transaction.

Non-limiting examples of virtual payment devices include payment applications provided on smartphones and other smart devices, (such as smart watches), which utilize short range communications to communicate user and payment information to a POS 104. Non-limiting examples of payment applications include GOOGLE PAY, APPLE PAY, SAMSUNG PAY, PAYPAL, and the like. The user authentication device 102B facilitates the simultaneous payment verification using multi-factor authentication of credit cards and credit accounts and as provided by the various embodiments of the present disclosure.

Figure 2:
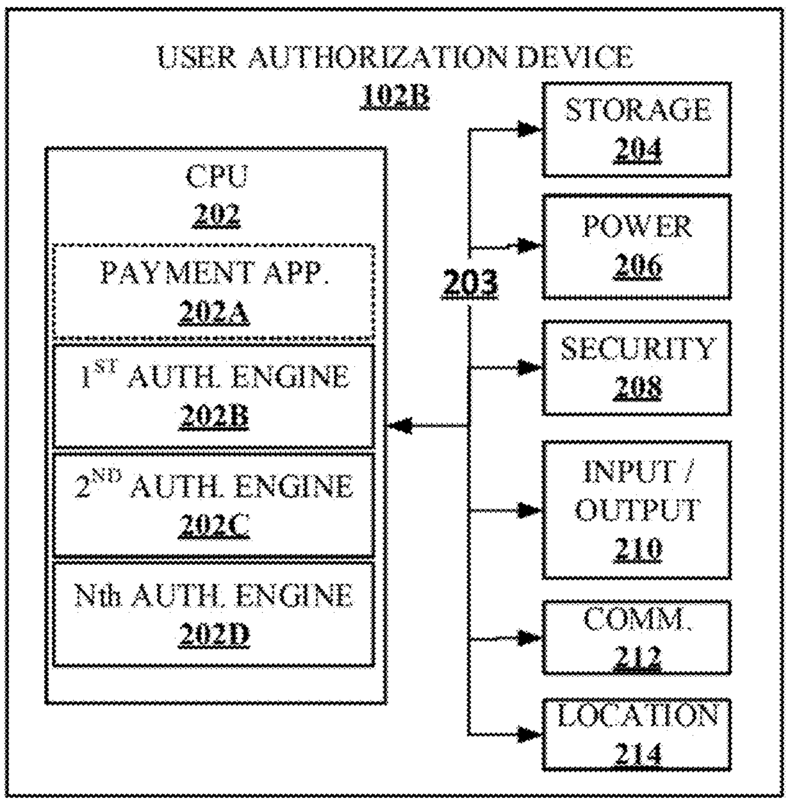
FIG. 2 is a schematic illustration of a user authorization device for use in substantially simultaneous payment verification using multi-factor authentication and in accordance with at least one embodiment of the present disclosure.

As shown in FIG. 2, the user authorization device 102B may include and/or be communicatively coupled to a central processing unit (CPU) 202. The CPU 202 may be provided by any local processing device capable of executing one more non-transient computer executable instructions (herein, each a "computer instruction") which, in accordance with an embodiment of the present disclosure, facilitate one or more data processing operations including, but not limited to: a payment application 202A, a first authentication engine 202B, a second authentication engine 202C and a third authentication engine 202C (such authentication engines are further described below). It is to be appreciated that the payment application 202A, as described above, may be considered to be a payment device 102A and thus may be an independent application executed separately from one or more of the authentication engines. It is to be appreciated that for at least one embodiment, one or more of the authentication engines 202-B/C/D may be combined and/or provided separately.

The CPU 202 may include one or more physical (as compared to logical) components configured for such data processing operations. For at least one embodiment, the CPU 202 may include one or more hardware processors, such as 32-bit and 64-bit central processing units, multi-core ARM based processors, microprocessors, microcontrollers, and otherwise. The computer instructions may include instructions for executing one or more applications, software engines, and/or processes configured to perform computer executable operations. Such hardware and computer instructions may arise in any desired computing configuration including, but not limited to, local, remote, distributed, blade, virtual, or other configurations and/or systems configured for use in support of the one or more embodiments of the present disclosure.

The CPU 202 may be communicatively coupled by a data bus 203 or similar structure to a storage device 204 or other computer readable medium, which is shown in FIG. 2 as a single storage device for purposes of description herein only. The storage device 204 may be provided locally with the user authorization device 102B or remotely, such as a data storage service provided on the Cloud, and/or otherwise. Storage of data, including but not limited to payment information, user authentication information, and other information may be managed by a storage controller (not shown) or similar component. It is to be appreciated such storage controller manages the storing of data and may be instantiated in either or both of the storage device 204 and/or the CPU 202. Any known or later arising storage technologies may be utilized in conjunction with an embodiment of the present disclosure.

Available storage provided by the storage device 204 may be partitioned or otherwise designated by the storage controller as providing for permanent storage and temporary storage. Non-transient data, computer instructions, or otherwise may be suitably stored in the storage device 204. As used herein, temporary storage is distinguished from transient storage, with the latter providing a location for temporarily storing data, variables, or other instructions used for a then arising data processing operations. A non-limiting example of a transient storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store non-transient computer instructions, content and other data.

The user authorization device 102B may be further configured, for at least one embodiment, to include a power module 206. The power module 206 may include any known or later arising technologies which facilitate the use of electrical energy by a content access device. Non-limiting examples of such technologies include batteries, power converters, inductive charging components, line-power components, solar power components, and otherwise.

The user authorization device 102B may be further configured, for at least one embodiment, to include a security module 208. The security module 208 may include any known or later arising security hardware components and/or computer instructions configured for use to secure content, communications regarding such content, access device processes and data, and otherwise. Security components may be used to facilitate secure transmission, processing, storage and otherwise of any data used in accordance with an embodiment of the present disclosure.

The user authorization device 102B may be further configured, for at least one embodiment, to include an input/output module 210. The input/output module 210 may include any known or later arising human to device interface components, processes and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The input/output module 210 may be coupled to and/or include the one or more presentation devices (not shown). The presentation devices facilitate interactions between the user and the user authorization payment system 102.

The user authorization device 102B may be further configured, for at least one embodiment, to include one or more communications modules 212. The communications modules 212 may be configured to use any known or later arising communications and/or networking technologies which facilitate simultaneous payment verification using multi-factor authentication, in accordance with an embodiment of the present disclosure.

The user authorization device 102B may be further configured, for at least one embodiment, to include one or more location modules 214. The location modules 214 may be configured to use any known or later arising location determining technologies including positioning signals provided, for example and not limited to, those by the GPS system 114.

POS System 104

For at least one embodiment, the POS 104 may be similarly configured to the UPS 102 to include one or more processors, data storage components, user interface components, security components, communications, and location components. The characteristics and capabilities of such components are well known in the art and one or more of such components may be configured to execute computer instructions which facilitate simultaneous payment verification using multi-factor authentication in accordance with at least one embodiment.

Acquiring Bank System (ABK) 108

For at least one embodiment, the ABK 108 may be similarly configured to the UPS 102 to include one or more processors, data storage components, user interface components, security components, communications, and location components. The characteristics and capabilities of such components are well known in the art and one or more of such components may be configured to execute computer instructions which facilitate simultaneous payment verification using multi-factor authentication in accordance with at least one embodiment.

Clearing System (CS) 110

For at least one embodiment, the CS 110 may be similarly configured to the UPS 102 to include one or more processors, data storage components, user interface components, security components, communications, and location components. The characteristics and capabilities of such components are well known in the art and one or more of such components may be configured to execute computer instructions which facilitate simultaneous payment verification using multi-factor authentication in accordance with at least one embodiment.

Issuing Bank System (IBK) 112

For at least one embodiment, the IBK 112 may be similarly configured to the UPS 102 to include one or more processors, data storage components, user interface components, security components, communications, and location components. The characteristics and capabilities of such components are well known in the art and one or more of such components may be configured to execute computer instructions which facilitate simultaneous payment verification using multi-factor authentication in accordance with at least one embodiment.

Figure 3:
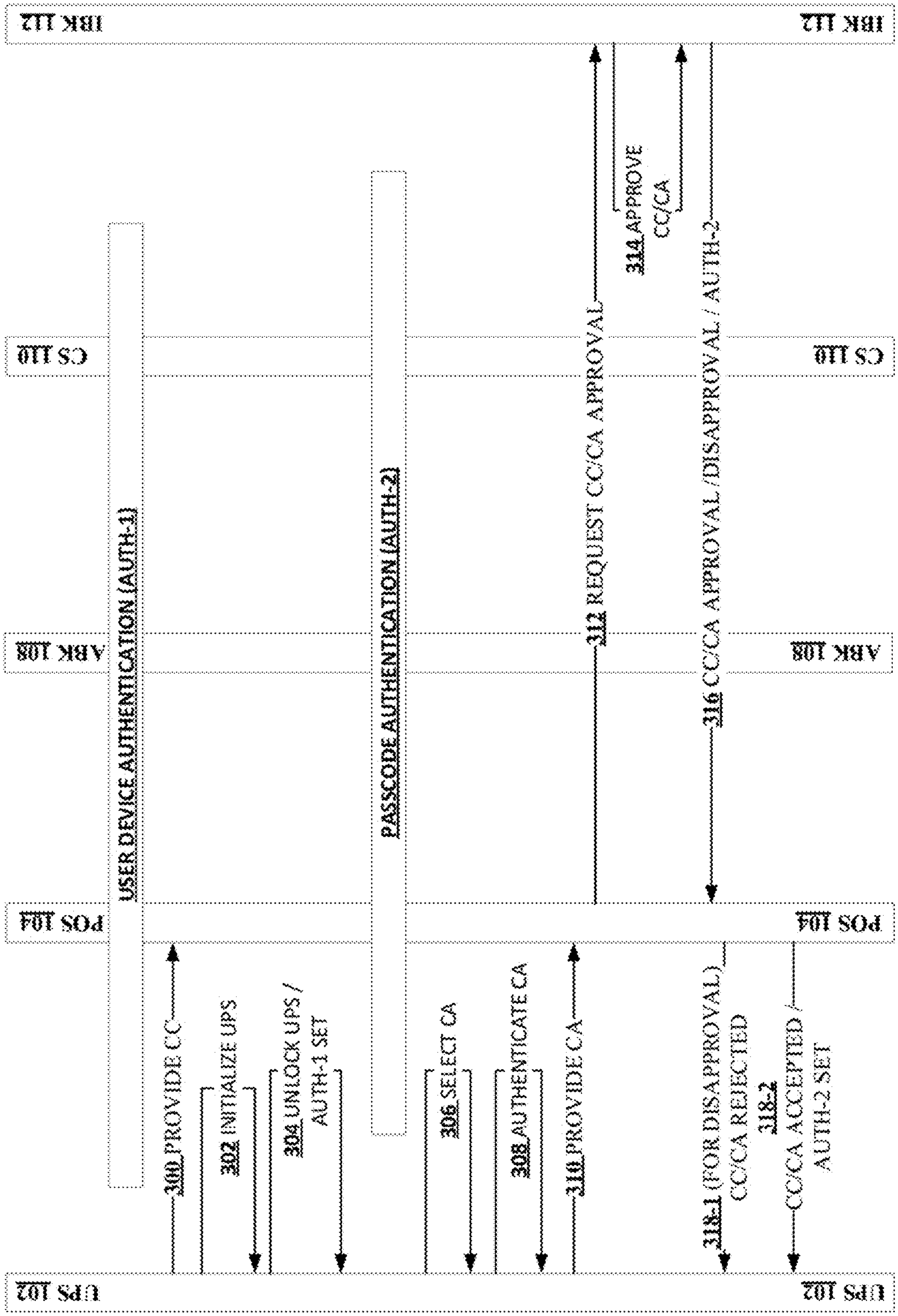
FIG. 3 is a flow diagram illustrating an initial authentication process that may be used to facilitate substantially simultaneous payment verification using multi-factor authentication and in accordance with at least one embodiment of the present disclosure.
Figure 4:
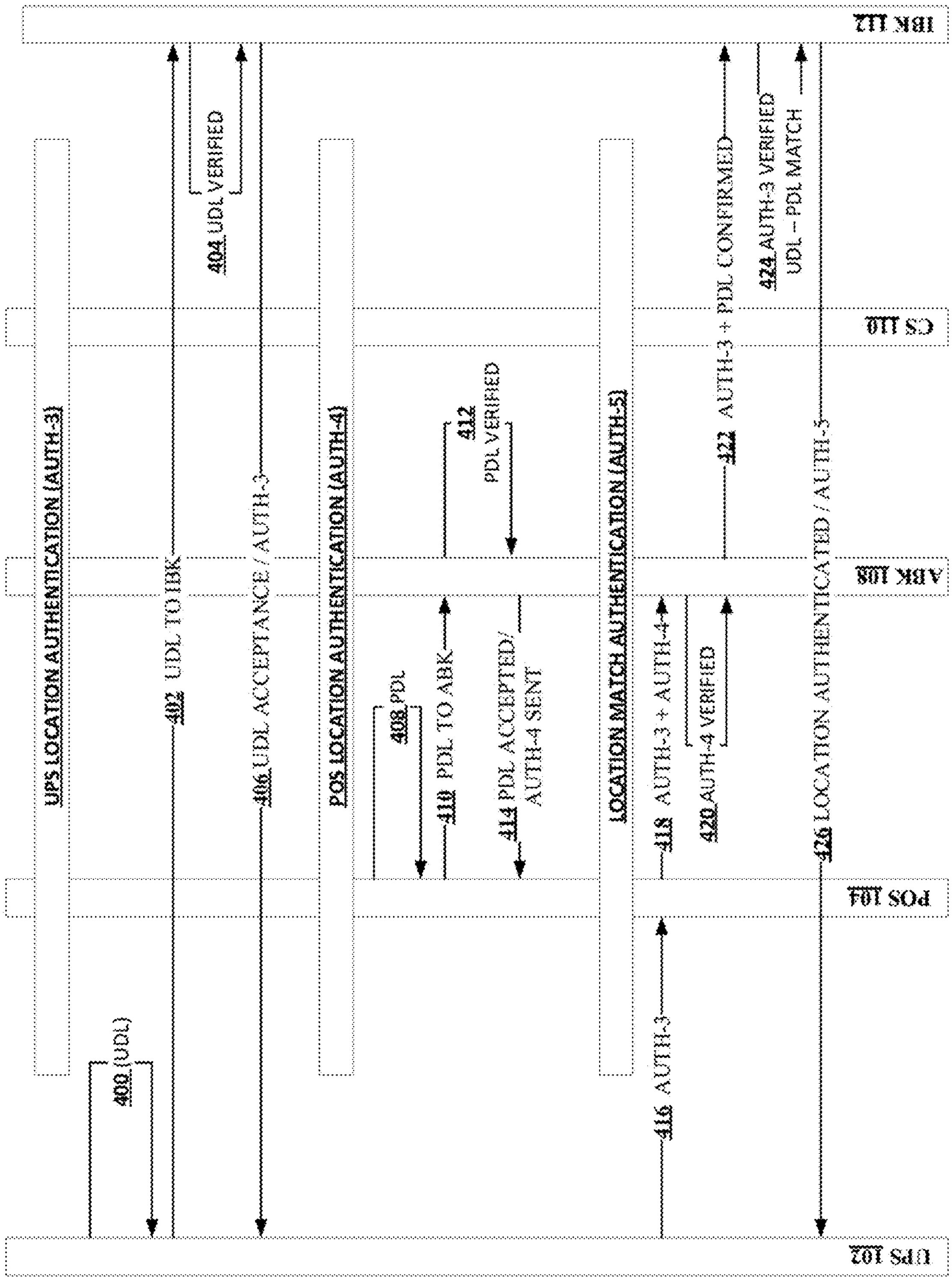
FIG. 4 is a flow diagram illustrating a location based authentication process that may be used to facilitate substantially simultaneous payment verification using multi-factor authentication and in accordance with at least one embodiment of the present disclosure.
Figure 5:
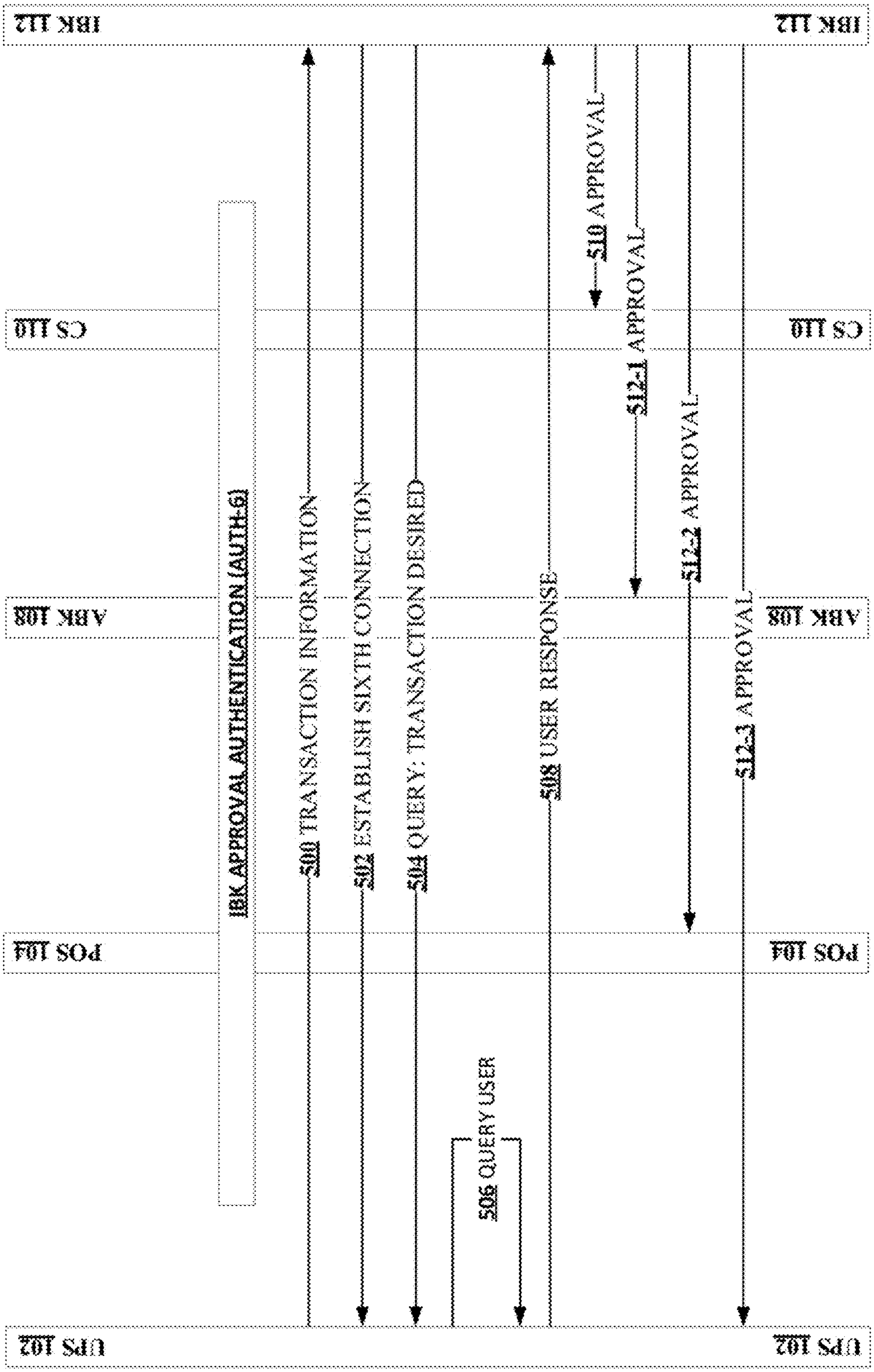
FIG. 5 is a flow diagram illustrating an issuing bank based authentication process that may be used to facilitate substantially simultaneous payment verification using multi-factor authentication and in accordance with at least one embodiment of the present disclosure.

As shown in FIGS. 3, 4 and 5, one or more authentication operations may be used in accordance with an embodiment of the present disclosure. Such authentication operations are identified by number as first, second, third or other "authentication" operations. Such numbering is for purpose of identification only and is not used herein to infer or impute that a given authentication operation need occur before, after, in conjunction with, separately, or otherwise of any other authentication operation.

More specifically, and as shown in FIG. 3 with respect to a first and second authentication operations, a process for simultaneous payment verification using multi-factor authentication and in accordance with at least one embodiment of the present disclosure may include one or more authentication operations performed separately by the first authorization engine 202B, the second authorization engine 202C, the nth authorization engine 202D, and/or in combination with one or more of the POS 104, ABK 108, CS 110, and/or IBK 112. The one or more operations may include use of one or more of the first thru sixth network connections 106-1/2/3/4/5/6. The operations of FIG. 3 may vary based upon whether a credit card or a credit account is used to facilitate a given transfer of funds from a user to a merchant.

As shown by Operation 300, when a credit card (CC) is used, the process may include a providing, to the merchant, access to the CC information. Such providing of access may occur by one or more human actions which facilitate a technological exchange of funds data from the user to the merchant. For example, the user may swipe, tap, insert, input, communicate verbally, scan, or otherwise provide information from the CC to the given merchant's POS 104.

As shown by Operations 302 thru 310, when a credit account (CA) is used for a given transaction, the process may begin with one or more initial authorization operations. The initialization operations may be provided to configure the UPS 102 for use in one or more transactions. As used herein, a UPS 102 is commonly locked or otherwise secured such that use of the UPS 102 for, at least, transactional purposes is prohibited without further user action.

Per Operation 304, initialization of the UPS 102 may involve unlocking of the UPS 102 and setting the UPS 102 status at a first authentication ("AUTH-1") setting by setting an AUTH-1 flag. One or more known or later arising UPS unlocking technologies and operations associated may be used including, but not limited to, the providing of a user passcode, a user password, a user specific swipe, a user biometric indicator (such as a fingerprint, facial recognition, recognizable speech pattern, or the like), or otherwise. It is to be appreciated that for many currently available payment verification systems, user initialization is commonly the only user verification required. Accordingly, for at least one embodiment of the present disclosure, the user device initialization operations of Operation 302-1 are considered to be AUTH-1 operations; such AUTH-1 operations are further referred to herein as "User Device Authentication" operations.

Further, per Operations 306 and 308, UPS 102 initial authorization may involve one or more user actions by which a given CA is selected for use, per Operation 302, and authenticated, per Operation 304. It is to be appreciated that a UPS 102 may be configured to include multiple CAs. Each CA may have unique authentication requirements and operations. Such CA authentication operations may include use of one or more of the above described technologies that may be used to unlock a payment application or CA on a UPS 102, such as, providing a unique passcode or the like for the payment application and/or CA. In accordance with at least one embodiment of the present disclosure, the providing of such a CA passcode, or the like, is considered to be performed in accordance with a second authentication ("AUTH-2") operation; such AUTH-2 operations are further referred to herein as "Passcode Authentication" operations. It is to be appreciated that a first authentication, relative to a second authentication, may respectively occur before, after, in conjunction with, or otherwise. For at least one embodiment, only one and not both of a first authentication and a second authentication may be used.

Per Operation 310, a UPS 102 initial authorization may include the operations of communicating the authenticated CA information to the POS 104, for the given transaction.

Per Operation 312, a CC and/or CA initial authorization may include the operation of the POS 104 communicating the as received CC information and/or the as communicated CA information, as the case may be, to the relevant IBK 112, via one or more of an ABK 108 and a CS 110. For at least one embodiment, Operation 312 may occur via a direct link between a POS 104 and the IBK 112 and without involvement of one or more of the ABK 108 and/or the CS 110.

Per Operation 314, the IBK 112 reviews the provided CC and/or CA information and either approves or disapproves use of the provided CC and/or CA information. The approval or disapproval of the provided CC and/or CA information may arise for any reason and is not limited herein.

Per Operation 316, the approval or disapproval of the provided CC and/or CA information is communicated back to the POS 104. For at least one embodiment, the approval/disapproval is communicated back to the POS 104 directly. For at least one embodiment, the approval/disapproval is communicated back to the POS 104 via one or more of the CS 110 and the ABK 108 used for Operation 312. For at least one embodiment, the approval specifies a credit limit.

Per Operations 318-1 and 318-2 and based upon the communication received per Operation 316, the POS 104 communicates to the UPS 102 either a rejection, per Operation 318-1, or acceptance, per Operation 318-2. The UPS 102 suitably provides such information to the user, as desired, in a humanly perceptible format.

For a CC based transaction, such acceptance or rejection may occur in a humanly perceptible format, such as a visual message, an audio message or otherwise. For at least one embodiment, for either of a CC and/or CA transaction, communication of the acceptance and/or rejection may occur via a user associated UPS 102. It is to be appreciated that such user associated device may be the same as the UPS 102 used to provide the CA information to the POS 104 or a different user device.

In accordance with at least one embodiment of the present disclosure, the providing and acceptance of a CC and/or CA is considered to be a completion of the second authentication (AUTH-2) operation and an AUTH-2 flag or the like may be set for a UPS 102.

As shown in FIG. 4 and for at least one embodiment of the present disclosure, authentication operations may include one or more location based authentication operations. Such location based authentication operations may occur automatically, manually and/or semi-automatically. Such location based authentication operations may occur independent of, in conjunction with, in lieu of, or otherwise with respect to one ore more other authentication operations described herein including, but not limited to, to the initial authentication (AUTH-1) and the second authentication (AUTH-2) operations described above. Such one or more location based authentication operations may occur, when desired, using any desired user or merchant location information.

As used and further described herein, "UPS Location" authentication operations are referred to and identified as third authentication ("AUTH-3") operations, "POS Location Authentication" operations are referred to and identified as fourth authentication ("AUTH-4") operations, "Location Match Authentication" operations are referred to herein and identified as a fifth authentication ("AUTH-5"), and "IBK Approval" authentication operations are referred to and identified as sixth authentication ("AUTH-6") operations.

As more specifically shown in FIG. 4, one example of a location based authentication operation may involve, per Operation 400, determining a user's current location (herein, such location being a "user determined location (UDL)"). It is to be appreciated that a determining of a UDL may occur using any known or later arising location determination devices, systems and processes including, but not limited to, GPS system 114, cellular based location determining systems, user inputs, user recognition based upon facial recognition, license plate readers, or otherwise. A UDL may be based upon a UPS 102 device location and/or a known location of another device or system with respect to which the user has an association. For example, a user's mobile phone device may be provided separate from a UPS 102 device (such as a smartwatch), yet a current location of the mobile device may be used to derive (and thus determine) a location of the UPS device—the smartwatch. Similarly, a user's known check-in to a hotel or other establishment may be used to determine a UDL.

Accordingly, and for at least one embodiment of the present disclosure, a determining of a UDL may be based upon an actual location of a UPS 102, imputed and/or derived based upon previously known locations of the user or a device associated therewith, future planned locations (such as those provided by an electronically stored itinerary), or otherwise. Further, and for at least one embodiment, "determined" as used in the context of a user's location may involve a location identification within a desired geographic area, such as within a store, a neighborhood, a city, a state, a country, or otherwise. A range of such desired geographic area may be predetermined, real-time determined, variably determined based upon a geographic region, based upon amount to be transacted, a nature of goods or services involved in a transaction, or otherwise. For example, a UDL for user in a country more commonly associated with financial fraud transactions may require a higher degree of location determining precision than a transaction occurring in a less-fraud ripe region.

As shown in Operation 400, the determining of a UDL occurs, for at least one embodiment, by the UPS 102. For other embodiments, the UDL may be determined by other devices and such a determined location provided to the UPS 102 by a third party service, another device, or otherwise.

Per Operation 402, the UDL is communicated by the UPS 102 to the IBK 112. The providing of the UDL to the IBK 112 may occur at any given time, based upon any given event, and at any desired frequency. For example, an activation of a payment application on a user's smartphone or other device may trigger Operations 400 and 402. Such Operations may occur before any other details for a contemplated transaction are provided to a POS 104 or other system element.

Per Operation 404, the IBK 112 verifies the received UDL information. Verification may occur using any information available to the IBK 112. For example and for at least one embodiment of the present disclosure, the IBK 112 may be configured to access one or more data records identifying a given user's previous spending patterns—such spending patterns being indicative of one or more of locations where valid (non-disputed) purchases have previously occurred. For example, a purchase at a local grocery store may be readily verified, whereas one in a different country may not. Further, such independent information may include a user's previously identified travel information, such as travel to a foreign city, during a given period of time. Further, such independent information may be obtainable from a verified third party source, such as a merchant system employing facial recognition technology—information provided by such merchant be available for use by the IBK 112 to verify locations of a user.

Per Operation 406, the IBK 112 communicates an UDL acceptance or rejection message to the UPS 102. When an UDL acceptance message is communicated, the UPS 102 may be considered to be authenticated for use within a determined geographic area. For at least one implementation of an embodiment of the present disclosure, such determined geographic area may be limited to a few meters, for other implementations, any desire area may be specified, including worldwide. For at least one embodiment, a geographic area may be limited with respect to on-line transactions based upon an actual area for a desired merchant. Similarly, an UDL rejection message may limit use of an UPS to any given geographic area, including online uses, and including prohibiting all transactions for one or more payment mechanisms issued by the IBK 112 and with respect to a given user.

Further, when an UDL acceptance message is communicated an AUTH-3 flag may be set and the AUTH-3 operations may be deemed complete. It is to be appreciated that a fourth authentication may occur independently and/or in conjunction with any other authentication operation(s) described herein.

As further shown in FIG. 4 and in Operations 408 to 414, location based authentication operations may also, alternatively and/or additionally, occur with respect to a merchant POS 104 device location. A POS 104 device may have a location that is fixed physically and/or virtually. For example, a POS 104 may be associated with a brick and mortar store have an actual location. Similarly, a POS 104 may be associated with a website having fixed, virtual location, such as a given IP address, or otherwise. Such fixed virtual location may be associated with a given website or a given on-line merchant service, such as those provided by Amazon Inc., Facebook Inc., and others.

Per Operation 408 and regardless of whether physical or virtual, a POS 104 is considered to have a location that may be determined to within a desired degree of accuracy. Any currently known or later arising technologies may be used in determining a POS location (such determined location being identified herein as a "POS determined location (PDL)").

Per Operation 410, the PDL may be communicated to an ABK 108. Operation 410 may occur as many times (including, but not limited to, once), and at any desired frequency or repetition interval desired. The PDL may be communicated in response to a query from an ABK, in response to initialization of a transaction, or otherwise.

Per Operation 412, the PDL is verified by the ABK 108. Verification may include one or more operations used by an IBK 112 to verify a UDL, and/or other operations. Like a UPS 102, a POS 104 may be mobile. Thus, Operations 408 to 412 may occur on any desired interval for a given implementation of an embodiment of the present disclosure.

Per Operation 414, ABK 108 communicates a PDL acceptance or rejection message to the POS 104. When a PDL acceptance message is communicated, the POS 104 may be considered to be authenticated for transactions within a determined geographic area. For at least one implementation of an embodiment of the present disclosure, such determined geographic area may be limited to a few meters, for other implementations, any desire area may be specified, including worldwide. For at least one embodiment, a geographic area may be limited with respect to on-line transactions based upon an actual area for a desired merchant. Similarly, a PDL rejection message may prohibit and/or limit use of the POS 104 to any given geographic area, including online uses, any, specific, and/or all transactions or otherwise.

Further, when a PDL acceptance message is communicated an AUTH-4 flag may be set and the AUTH-4 operations may be deemed complete. It is to be appreciated that a fifth authentication may occur independently and/or in conjunction with any other authentication operation(s) described herein.

As further shown in FIG. 4 and in Operations 416 to 426, location-based authentication operations may also, alternatively and/or additionally, occur with respect to each of a UDL and PDL, for a given transaction. For at least one embodiment, a given transaction may include communication of each of an AUTH-3 verification and an AUTH-4 verification. The AUTH-3 verification may be communicated, by the so verified UPS 102, to given POS, for a given transaction. The AUTH-4 verification may be communicated separately and/or in conjunction with any other transaction information.

Per Operation 418, the POS 104 may be configured to attach its AUTH-4 verification to the received AUTH-3 information and communicate the combined information to the ABK 108.

Per Operation 420, the ABK 108 verifies the AUTH-3 information and the AUTH-4 information. If the verification fails, a reply message may be communicated back to the POS 104 and/or other corrective actions may occur such as terminating approved use of the POS 104 until proper location authentication is provided.

Per Operation 422, when the AUTH-3 information is verified (as matching a previously determined PDL for the POS 104), the PDL information, the AUTH-3, and any other so desired to be communicated transaction related information, is communicated to the IBK 112.

Per Operation 424, the IBK 112 verifies the AUTH-4 information received from the ABK 108. If such information is not verified, corrective actions may occur. If the AUTH-4 information is verified, the IBK 112 may be configured to compare the UDL (as associated with the AUTH-3 information) with the PDL information (as provided by the ABK 108) to determine whether the identified locations for each of the UPS 102 and the POS 104 are within a given geographic area. The geographic area may be a given location, a given area, a given distance of a UPS 102 to a POS 104, or otherwise. Such given location, area, distance, and otherwise may be pre-determined, variably determined, or otherwise. If the UDL and PDL do not match (as not then arising within the given location, area, distance or otherwise), the transaction may be rejected, or other corrective actions may be requested by the IBK 112.

Per Operation 426, when the UPS 102 and POS 14 match, the transaction may be accepted and a location authenticated message may be communicated to one or more and/or each of the CS 110, ABK 108, POS 104, and UPS 102, an AUTH-5 flag may be set at one or more of such system components, and the AUTH-5 operations may be deemed complete.

In accordance with at least one embodiment, it is to be appreciated that separately and/or combined the AUTH-3 data, the AUTH-4 data and/or AUTH-5 data may operate as security keys, or other security mechanisms used to secure communications of information between a sender and one or more designated recipients. For example, an AUTH-3 verification may be used in a private-public key exchange between the UPS 102 and the IBK 112, an AUTH-4 verification may be used in a private-public key exchange between the POS 104 and the ABK 108, and an AUTH-5 verification may be used by one or more, if not each, of the UPS 102, POS 104, ABK 108, CS 110, and IBK 112 in securing information (during transaction, storage or otherwise) for a given transaction or series of transactions (such as, repeat transactions between a given UPS 102 and a given POS 104 or collection of POS 104 provided at a merchant site).

Further, it is to be appreciated that the location information and processes described above may arise with respect to one or more of an ABK 108, CS 110, and IBK 112. That is UDL and PDL and the verification and/or non-verification thereof may be used by one or more such processing systems in determining whether to approve a given transaction. For example, a CS 110 may be configured, upon repeat rejections of a UDL or a PDL request, to deny all transactions for a given UPS 102 or a POS 104 (as the case may be) until satisfactory corrective actions have occurred.

As shown in FIG. 5 and for at least one embodiment of the present disclosure, authentication operations may include one or more issuing bank authentication operations. It is to be appreciated that the issuing bank authentication operations described herein may arise with respect to any system component such as one or more of the ABK 108, CS 110, and IBK 112. For conciseness purposes only, such operations are referred to as "issuing bank authentication operations."

Such issuing bank authentication operations may occur automatically, manually and/or semi-automatically. Such issuing bank authentication operations may occur independent of, in conjunction with, in lieu of, or otherwise with respect to one or more other authentication operations described herein.

More specifically, issuing bank authentication operation may include, per Operation 500, a communication of transaction information from a UPS 102, via a POS 104 and one or more of an ABK 108 and CS 110, to an issuing bank IBK 112. Such transaction information may include any desired information a given transaction. Communication of such transaction information may occur using any desired connection(s), including connections 106-1, 106-2, 106-3, and 106-4.

Per Operation 502, the process may include the issuing bank IBK 112 establishing a separate connection, such as the sixth connection 106-6, with the UPS 102. For at least one embodiment, the sixth connection 106-6 is established using 5G technology. For at least one embodiment, the sixth connection 106-6 is established substantially simultaneously with a user's providing of CC and/or CA information to a POS 104. For at least one embodiment, the sixth connection 106-6 is established upon a user access a payment application. For at least one embodiment, one or more of the second authentication (AUTH-2), third authentication (AUTH-3) and/or fifth authentication (AUTH-5) are communicated to the UPS 102 over the sixth connection.

Per Operation 504, the process may include sending a query, by the IBK 112 to the UPS 102, that a given transaction with a given POS 104, as set forth in the transaction information communicated per Operation 500, is desired. For at least one embodiment, the query is sent substantially simultaneously with the sending of the transaction information per Operation 500. For at least one embodiment, sending of the query facilitates substantially simultaneous payment verification, as defined above.

Per Operation 506, the UPS 102 queries the user for approval or rejection of the transaction. It is to be appreciated that this querying of the user effectively operates as an independent verification of a user's desire to engage in a given transaction when the communication links utilized are separate and discrete, as provided by separate communication links and/or secure connections, from those used to convey transaction information by and between a POS 104 and one or more of an ABK 108, CS 110, and IBK 112. The user's approval or rejection may occur using any desired UPS 102 to human interface.

Per Operation 508, the user responds to the query. The user response may include an approval, an approval in part (such as where a user desired credit limit is specified), a rejection, a rejection in part, a request for additional information, or otherwise. The user response may be provided to the UPS 102 using any desired and currently known or later arising human to UPS 102 interface components, including but not limited to, voice recognition, text input, touch screen input, facial inputs (e.g., blinking, smiling, or the like), or otherwise.

Per Operation 510, upon receipt of the user response, the IBK 112 provides an approval message to the clearing system 110. The approval message authorizes the clearing system 110 to finalize the transaction in accordance with standard credit card transaction processing procedures, such as those described by Papadimitriou. The approval message may be provided separately and/or with a transaction approval code to the CS 110, as described by Papadimitriou. In accordance with at least one embodiment of the present disclosure, the providing and acceptance of the approval code is considered to be a completion of the sixth authentication (AUTH-6) operation and an AUTH-6 flag or the like may be set or otherwise associated with one or more a UPS 102, POS 104, ABK 108, CS 110, and IBK 112.

Per Operation 512, the approval (provided by Operation 510), may be further communicated separately or collectively to one or more of the ABK 108, POS 104, UPS 102 or otherwise, as shown by approval messages 512-1, 512-2 and 512-3. Such communication may occur using any of the desired connections including direct connections between one or more of the system components or relayed connections between two or more system components.

Further, it is to be appreciated that the process of FIGS. 3-5 provide additional authentication processes, as identified by AUTH-1 thru AUTH-6, one or more of which may be used in addition to those commonly used today for credit card transaction processing, as described by Papadimitriou. Such existing processes provide what is defined herein to be an "initial authentication." It is to be further appreciated that one or more of the first through sixth authentication processes and the AUTH-1 thru AUTH-6 authentications provided thereby may be used in any combination or permutation with each other and/or with the initial authentication. For example, an AUTH-1 process may be performed before an initial authentication while an AUTH-2 process is performed in conjunction with an initial authentication. For at least one embodiment, an AUTH-3 process may be performed prior to an initial authentication. For at least one embodiment, an AUTH-4 process may be performed when a POS 104 is first activated for any given transaction processing window, such as once an hour, day, week, month, or otherwise. For at least one embodiment, an AUTH-5 process may be performed whenever a preceding AUTH-3 and AUTH-4 process has been performed. For at least one embodiment, an AUTH-5 process may be performed any time transaction information is available for communication and initial authentication, as per, for example and not by limitation, the process described by Papadimitriou.

It is to be appreciated that the operations described above and depicted in FIGS. 3-5 are illustrative only and are not intended herein to occur, for all embodiments of the present disclosure, in the order shown, in sequence, or otherwise. One or more operations may be performed in parallel and operations may be not performed, as provided for any given use of an embodiment of the present disclosure.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A system comprising:

a user payment system (UPS);

a point of sale system (POS) communicatively coupled to the UPS; and an issuing bank system (IBK) communicatively coupled to at least the POS;

wherein the IBK system comprises an IBK hardware processor configured to execute IBK non-transient computer executable instructions (IBKIs) including:

establishing a first fifth generation (5G) wireless connection between the IBK and the UPS;

communicating, using the direct connection, a query to the UPS;

receiving a first response, from the UPS, to the query; and based, upon the first response, determining whether to approve a given transaction;

wherein the UPS further comprises:

an UPS hardware processor; and an UPS storage, coupled to the UPS hardware processor, storing UPS non-transient computer executable instructions (UPSIs);

wherein the UPSIs, when executed by the UPS hardware processor performs operations comprising:

facilitating a first authentication process by:

providing a credit account (CA) information to the POS; and setting a first authentication verification flag (AUTH-1);

wherein the CA information is provided using a second 5G wireless connection;

when the AUTH-1 flag is set:

facilitating a second authentication process by:

providing a CA passcode to the POS;

receiving, from the POS via the second 5G wireless connection, one of a second approval message or a second disapproval message;

presenting, as appropriate, the second approval message or the second disapproval message to a user of the UPS; and setting, when the UPS receives the approval message, a second authentication verification flag (AUTH-2);

when the AUTH-2 flag is set:

facilitating a third authentication process by:

communicating, using a third 5G wireless connection, a current user determined location (UDL) to the IBK;

receiving, from the IBK using the third 5G wireless connection, one of a third approval message or a third disapproval message;

wherein the third approval message indicates the UPS is approved for use within a determined geographic area; and setting, when the third approval message is received, a third authentication verification flag (AUTH-3) in the UPS; and when the AUTH-3 flag is set:
facilitating a fourth authentication process by:
communicating, using the second 5G wireless connection, an AUTH-3 verification to the POS;
when a location authenticated message is received from the IBK:
facilitating a fifth authentication process by:
setting a fifth authentication verification flag (AUTH-5) in the UPS;
wherein the POS is configured to perform operations including:
communicating, using a fourth 5G wireless connection, the CA and the CA passcode to the IBK;
receiving, from the IBK via the fourth 5G wireless connection and in response to the communicating of the CA and the CA passcode to the IBK, one of the second approval message or the second disapproval message;
facilitating a fourth authentication process by:
communicating, using a fifth 5G wireless connection, a current POS determined location (PDL) to an acquiring bank system (ABK);
receiving, from the ABK via the fifth 5G wireless connection, one of a fourth approval message or a fourth disapproval message;
wherein the fourth approval message indicates the PDL is verified; and
setting, when the fourth approval message is received, a fourth authentication verification flag (AUTH-4) in the PDL; and
facilitating the fifth authentication process by:
receiving, via the second 5G wireless connection, the AUTH-3 from the UPS; and
communicating the AUTH-3 and the AUTH-4 to the ABK;
wherein the ABK is configured to perform operations including:
facilitating the fifth authentication process by:
receiving, via the fifth 5G wireless connection, the AUTH-3 and the AUTH-4 from the POS;
verifying the AUTH-3 with the AUTH-4; and
when verified:
communicating, via a sixth 5G wireless connection, the PDL and the AUTH-3 to the IBK;
wherein the IBKIs further comprise instructions for:
facilitating the fifth authentication process by:
receiving, via the sixth 5G wireless connection, the PDL from the ABK;
verifying the UDL with the PDL;
when verified:
communicating, via the first 5G wireless connection, a location authenticated message to the UPS.

2. The system of claim 1,
wherein the first 5G wireless connection comprises a at least one of a first 5G mid-band wireless communications link and a first 5G high-band wireless communications link.

3. The system of claim 1,
wherein the query is communicated to the UPS substantially simultaneously with receipt, by the IBK, of a request to approve the given transaction.

4. The system of claim 1,
wherein the first non-transient computer executable instructions further include:
communicating an approval for the given transaction to a clearing system (CS) for a credit card transaction processing system.

5. The system of claim 4,
wherein the approval is communicated substantially simultaneously with an inputting, by a user of the UPS, of an approval for the given transaction.

6. The system of claim 5,
wherein the approval is communicated with an approval of the given transaction based upon when the AUTH-1 flag, the AUTH-2 flag, the AUTH-3 flag, and the AUTH-5 flag have been set in the UPS.

7. The system of claim 5,
wherein the approval is communicated to the CS based on a multi-factor authentication of the given transaction; and
wherein the multi-factor authentication includes the first authentication process, the second authentication process, the third authentication process, the fourth authentication process and the fifth authentication process.

8. The system of claim 4,
wherein the first non-transient computer executable instructions further include:
communicating an approval for the given transaction to the UPS.

9. The system of claim 1,
wherein the UPS is a smartphone associated with a given user.

10. The system of claim 1,
wherein the UPS comprises an UPS hardware processor configured to execute second non-transient computer executable instructions including:
initializing the UPS for transactional use;
facilitating establishment of the direct connection with the IBK;
receiving the query from the IBK;
presenting the query in a humanly perceptible format;
detecting a user response to the query;
converting the user response into the first response; and
communicating the first response to the IBK.

11. The system of claim 10,
wherein the initializing of the UPS occurs prior to communication of the given transaction to the IBK.

12. The system of claim 1,
wherein the second 5G wireless connection comprises one of a second 5G mid-band wireless communications link and a second 5G high-band wireless communications link.

13. The system of claim 12,
wherein the third 5G wireless connection comprises one of a third 5G mid-band wireless communications link and a third 5G high-band wireless communications link.

14. The system of claim 13,
wherein the fourth 5G wireless connection comprises one of a fourth 5G mid-band wireless communications link and fourth 5G high-band wireless communications link.

15. The system of claim 14,
wherein the fifth 5G wireless connection comprises at least one of a fifth 5G mid-band wireless communications link and a fifth 5G high-band wireless communications link.

16. The system of claim 1,
wherein the sixth 5G wireless connection comprises at least one of a 5G mid-band wireless communications link and a 5G high-band wireless communications link.

17. The system of claim 1, wherein the first through fifth 5G wireless connections facilitate substantially simultaneous multi-factor authentication.

18. The system of claim 1, wherein the query and the first authentication process occur simultaneously.

19. The system of claim 1, wherein the query and the first through fifth authentication processes occur simultaneously.

20. The system of claim 15, wherein the UPS is mobile and the UDL is changing during at least one of the first through fifth authentication processes.

21. The system of claim 20, wherein a mobile phone associated with the user provides the UDL.

* * * * *